Patented Feb. 22, 1944

2,342,191

UNITED STATES PATENT OFFICE 2,342,191

DYEING AND PRINTING CELLULOSE ESTERS AND ETHERS WITH AMINO-ANTHRAQUINONE DYES

Paul Grossmann, Binningen, Switzerland, assignor to the firm of Society of Chemical Industry in Basle, Basel, Switzerland No Drawing. Application May 25, 1940, Serial No. 337,318. In Switzerland June 10, 1939

17 Claims. (Cl. 8—25)

It has been found that compounds of the following general formula

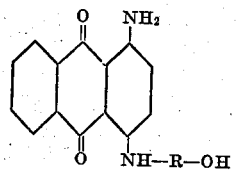

in which R represents a phenyl radical in which the OH-group stands in the para position to the NH-group, may be used with advantage in the dyeing and printing of artificial fibers which consist of esters and ethers of cellulose.

As artificial fibers consisting of esters and ethers of cellulose, rayons and staple fibers derived from acetyl cellulose come preferably into consideration, and these may contain, for example, admixtures of higher cellulose esters of higher fatty acids, for example of propionic acid.

Compounds which correspond to the above formula are 1:4-diaminoanthraquinones, in which the one amino group is not substituted and the other amino group is substituted by a p-hydroxyphenyl radical, in which case the phenyl radical may contain other substituents. These products may be dyed and printed by the methods in general use for the dyeing and printing of acetate cellulose rayon. By this means, blue shades of very good fastness to light are obtained.

It is particularly advantageous not to use the dyestuff as a chemically homogeneous product, but in mixture with such additional substances as may be disssolved in sulfuric acid and which, on being then poured into water, are re-precipitated in chemically unchanged form. An extraordinary increase in the exhaustion power of the dyestuff and in its tinctorial power is obtained if it be made into a paste with these substances in a suitable manner. By this pre-treatment, the dyestuffs, or their mixtures with the added substances, are brought into a very fine state of dispersion. This may be achieved, for example, during the manufacture of the dyestuff paste, if the compounds used as parent materials are at least partly dissolved in a suitable solvent and are then caused to be precipitated quickly by pouring into a diluting agent. By use of more than one dyestuff as parent material, as well as in those cases in which dyestuffs are used in combination with other added substances, it is possible in this way to obtain also a particularly intensive mixture of the components, which has proved to be advantageous in many cases for the present process.

For carrying out the precipitating process, those solvents come particularly into consideration which are miscible in all proportions with water, for example, sulfuric acid, so that the precipitation may take place with the help of ice or water.

The products which are soluble in sulfuric acid and which are reprecipitated in chemically unchanged form on pouring into water, with which the compounds of the above formula can be mixed or precipitated together and pasted may be either dyestuffs or non-dyestuffs. In the former case, those dyestuffs may be used with advantage which can simultaneously be used for the production of a desired shade, and to this group of dyestuffs belong, for example, substituted aminoanthraquinones, preferably aminoanthraquinones substituted by alkyl groups, for example, alkylated 1:4-diamino-anthraquinones, particularly 1 - alkylamino-4-arylaminoanthraquinones. As examples may be named 1-methylamino-4-anilidoanthraquinone, 1-methylamino-4 - (p - hydroxyphenyl) - aminoanthraquinone, 1 - methylamino - 4 - ethylaminoanthraquinone, 1:4-di-(n-butylamino)-anthraquinone, 1-methylamino-4-benzylaminoanthraquinone; also 1:4-di - (p - hydroxyphenylamino) - anthraquinone, 1:4-dianilidoanthraquinone and 1-amino-4-cyclohexylaminoanthraquinone, as well as the most varied hydroxyalkylaminoanthraquinones.

Compounds of non-dyeing types may belong to the group of hydrotropic agents, particularly to the series of the N-substituted aminobenzene sulfonic acids. Addition of inorganic compounds, for example, boric acid, also gives good results by the present process.

Among the substances which are suitable for use in the mixtures or mutual precipitates with the compounds of the above formula, the by-products and impurities must be mentioned which occur in the manufacture of the dyestuffs, for example, according to the process disclosed in U. S. A. patent application Serial No. 306,033, filed November 24, 1939.

The products obtained by mutual precipitation may be further pasted in known manner, for example, by grinding and may be converted into a form suitable for use in dyeing or printing. The usual dispersing agents, such as sulfite cellulose waste liquor, dextrine, soaps, aromatic sulfonic acids, such as technical naphthalene sulfonic acids as well as their higher molecular condensation products, prepared, for example, with formaldehyde, may all be used as added products in the grinding process.

*Example 1*

10 parts of the crude product obtained in Example 1 of U. S. A. patent application Serial No. 306,033 are dissolved in 80 parts of sulfuric acid of 80 per cent strength at room temperature, and the solution is poured on to ice. After stirring for a short time, the mixture is filtered and the precipitate is washed until free from acid. By grinding with sulfite cellulose waste liquor, a dyestuff paste containing 5 per cent of dyestuff is prepared.

20 parts of this paste are added to a dyebath which contains 2000 parts of water and 70 parts of Marseilles soap, and 100 parts of cellulose acetate rayon are dyed in this bath for 1½ hours at about 50–80° C. The acetate rayon is dyed a strong reddish-blue shade.

Dyestuff pastes having similar properties are obtained if the sulfite cellulose waste liquor be replaced in the grinding operation by dextrine, soaps, aromatic sulfonic acids, such as technical naphthalene sulfonic acids as well as their high molecular condensation products, prepared, for example, with formaldehyde.

*Example 2*

8 parts of pure 1-amino-4-(p-hydroxyphenyl)-aminoanthraquinone and 2 parts of 1-methylamino-4-anilidoanthraquinone are dissolved in 80 parts of sulfuric acid of 80 per cent strength, and the solution is poured on to ice. On proceeding further, as described in Example 1, a very strong, fast and pure blue dyeing is obtained. If, in this example, the 1-methylamino-4-anilidoanthraquinone be replaced by the same quantity of 1-methylamino-4-(m-toluidino)-anthraquinone, or 1-methylamino-4-(p-hydroxyphenyl-amino-anthraquinone or 1-ethylamino-4-anilidoanthraquinone or 1-(β-hydroxyethyl)-amino-4-anilidoanthraquinone, a similar result is obtained. It is often advantageous to make use of several components in the preparation of the mixture, such as, for example, 1-amino-4-(p-hydroxyphenyl)-aminoanthraquinone, 1-methylamino-4-anilidoanthraquinone and 1-(β-hydroxyethyl)-amino-4-anilidoanthraquinone.

*Example 3*

8 parts of pure 1-amino-4-(p-hydroxyphenyl)-aminoanthraquinone and 2 parts of 1:4-di-(p-hydroxyphenylamino)-anthraquinone are dissolved in 80 parts of sulfuric acid of 80 per cent strength and the solution is poured onto ice. After stirring for a short time, it is filtered and the precipitate washed until neutral. A paste is made in the usual manner, and it may be used for the dyeing and printing of acetate rayon by known methods.

In this example, the 1:4-di-(p-hydroxyphenyl)-aminoanthraquinone may be replaced by an equal quantity of 1:4-di-(butylamino)-anthraquinone, 1-methylamino-4-benzylaminoanthraquinone, 1-methylamino-4-ethylaminoanthraquinone, 1:4-di-(phenylamino)-anthraquinone or 1-amino-4-cyclohexylaminoanthraquinone.

*Example 4*

4 parts of 1-amino-4-(p-hydroxyphenyl)-aminoanthraquinone and 8 parts of the sodium salt of benzylsulfanilic acid are dissolved in 50 parts of sulfuric acid of 80 per cent strength at room temperature, and the solution is poured on to ice. After stirring for a short time, the mixture is filtered and the residue obtained is made into a paste containing 2.5 per cent dyestuff by addition of 16 parts of sulfite cellulose waste liquor and the necessary quantity of water. This paste can be used for dyeing according to the method given in Example 1, §2, and yields strong shades of pure blue.

What I claim is:

1. Process for the dyeing and printing of artificial fibers consisting of cellulose esters and ethers, comprising using such mixtures which are obtained by reprecipitating compounds of the general formula

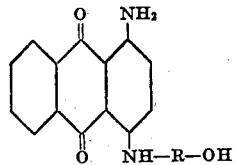

wherein R stands for a phenyl radical in which the OH-group is in the para position to the NH-group, together with aminoanthraquinone acetate-silk dyes different from that of the above formula.

2. Process for the dyeing and printing of artificial fibers consisting of cellulose esters and ethers, comprising using such mixtures which are obtained by reprecipitating compounds of the general formula

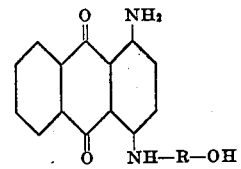

wherein R stands for a phenyl radical in which the OH-group is in the para position to the NH-group, together with alkylamino-anthraquinones.

3. Process for the dyeing and printing of artificial fibers consisting of cellulose esters and ethers, comprising using such mixtures which are obtained by reprecipitating compounds of the general formula

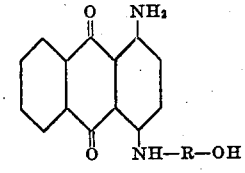

wherein R stands for a phenyl radical in which the OH-group is in the para position to the NH-group, together with 1-alkylamino-4-arylamino-anthraquinones.

4. Process for the dyeing and printing of artificial fibers consisting of cellulose esters and ethers, comprising using mixtures which are obtained by reprecipitating 1-amino-4-(p-hydroxyphenyl)-aminoanthraquinone with 1-methylamino-4-anilidoanthraquinone.

5. Process for the dyeing and printing of artificial fibers consisting of cellulose esters and ethers, comprising using mixtures which are obtained by reprecipitating 55 to 95 parts of 1-amino-4-(p-hydroxyphenyl)-aminoanthraquinone with 5 to 45 parts of 1-methylamino-4-anilidoanthraquinone.

6. Process for the dyeing and printing of artificial fibers consisting of cellulose esters and ethers, comprising using mixtures which are obtained by reprecipitating 75 to 85 parts of 1-amino-4-(p-hydroxyphenyl)-aminoanthraquinone with 15 to 25 parts of 1-methylamino-4-anilidoanthraquinone.

7. Process for the dyeing and printing of artificial fibers consisting of cellulose esters and ethers, comprising using mixtures which are obtained by reprecipitating 1-amino-4-(p-hydroxyphenyl)-aminoanthraquinone with 1-methylamino-4-(m-toluidino)-anthraquinone.

8. Process for the dyeing and printing of artificial fibers consisting of cellulose esters and ethers, comprising using mixtures which are obtained by reprecipitating 55 to 95 parts of 1-amino-4-(p-hydroxyphenyl)-aminoanthraquinone with 5 to 45 parts of 1-methylamino-4-(m-toluidino)-anthraquinone.

9. Process for the dyeing and printing of artificial fibers consisting of cellulose esters and ethers, comprising using mixtures which are obtained by reprecipitating 75 to 85 parts of 1-amino-4-(p-hydroxyphenyl)-aminoanthraquinone with 15 to 25 parts of 1-methylamino-4-(m-toluidino)-anthraquinone.

10. Process for the dyeing and printing of artificial fibers consisting of cellulose esters and ethers, comprising using mixtures which are obtained by reprecipitating 1-amino-4-(p-hydroxyphenyl)-aminoanthraquinone with 1-methylamino-4-anilidoanthraquinone, and adding 1-(β-hydroxyethyl)-amino-4-anilidoanthraquinone.

11. Process for the dyeing and printing of artificial fibers consisting of cellulose esters and ethers, comprising using mixtures which are obtained by reprecipitating 45 to 55 parts of 1-amino-4-(p-hydroxyphenyl)-aminoanthraquinone with 7 to 12 parts of 1-methylamino-4-anilidoanthraquinone, and adding 35 to 45 parts of 1-(β-hydroxyethyl)-amino-4-anilidoanthraquinone.

12. A dyeing and printing paste comprising, as essential dyeing and printing ingredient, the mixture obtained by reprecipitating a compound of the formula

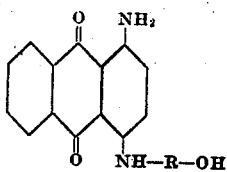

wherein R stands for a phenyl radical and the OH-group is in para position to the NH-group, together with an aminoanthraquinone acetate-silk dye different from that of the above formula.

13. A dyeing and printing paste comprising, as essential dyeing and printing ingredient, the mixture obtained by reprecipitating a compound of the formula

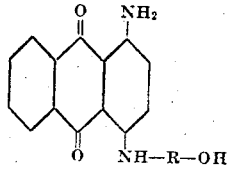

wherein R stands for a phenyl radical and the OH-group is in para position to the NH-group, together with an alkylamino-anthraquinone.

14. A dyeing and printing paste comprising, as essential dyeing and printing ingredient, the mixture obtained by reprecipitating a compound of the formula

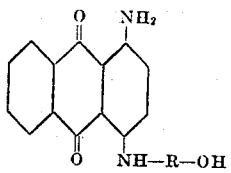

wherein R stands for a phenyl radical and the OH-group is in para position to the NH-group, together with 1-alkylamino-4-arylamino-anthraquinone.

15. A dyeing and printing paste comprising, as essential dyeing and printing ingredient, the mixture obtained by reprecipitating 55 to 95 parts of 1-amino-4-(p-hydroxyphenyl)-aminoanthraquinone with 5 to 45 parts of 1-methylamino-4-anilidoanthraquinone.

16. A dyeing and printing paste comprising, as essential dyeing and printing ingredient, the mixture obtained by reprecipitating 55–95 parts of 1-amino-4-(p-hydroxyphenyl)-aminoanthraquinone with 5 to 45 parts of 1-methylamino-4-(m-toluidino)-anthraquinone.

17. A dyeing and printing paste comprising, as essential dyeing and printing ingredient, the mixture obtained by reprecipitating 45 to 55 parts of 1-amino-4-(p-hydroxyphenyl)-aminoanthraquinone with 7 to 12 parts of 1-methylamino-4-anilido-anthraquinone, and adding 35 to 45 parts of 1-(β-hydroxyethyl)-amino-4-anilidoanthraquinone.

PAUL GROSSMANN.